United States Patent [19]

Wall

[11] Patent Number: 5,069,937

[45] Date of Patent: Dec. 3, 1991

[54] THERMAL SPRAYING OF STAINLESS STEEL

[75] Inventor: Nicholas J. Wall, Cheshire, Great Britain

[73] Assignee: Whitford Plastics Limited, Cheshire, Great Britain

[21] Appl. No.: 465,132

[22] PCT Filed: Aug. 22, 1988

[86] PCT No.: PCT/GB88/00689

§ 371 Date: Feb. 26, 1990

§ 102(e) Date: Feb. 26, 1990

[87] PCT Pub. No.: WO89/01534

PCT Pub. Date: Feb. 23, 1989

[30] Foreign Application Priority Data

Aug. 20, 1987 [GB] United Kingdom ............... 8719716

[51] Int. Cl.$^5$ ............................................. B05D 3/02
[52] U.S. Cl. .................................... 427/227; 427/380; 427/388.1; 427/405; 427/409; 427/423; 428/421; 428/463; 428/553; 428/685; 428/937

[58] Field of Search ............... 427/388.1, 422, 423, 427/421, 327, 405, 409, 227, 380; 428/553, 685, 937, 421, 463

[56] References Cited

U.S. PATENT DOCUMENTS 4,088,046  5/1978  Severinsson ................ 76/107 R
4,753,848  6/1988  Sugarman et al. ............ 428/420

FOREIGN PATENT DOCUMENTS 0092309  10/1983  European Pat. Off. .
1527920  3/1967  France .
1191700  5/1970  United Kingdom .

Primary Examiner—Michael Lusignan
Attorney, Agent, or Firm—Jeffers, Hoffman & Niewyk

[57] ABSTRACT

A method of preparing a roughened substrate surface for subsequent coating with a fluorocarbon polymer in a liquid medium. The surface of the substrate is thermally sprayed with a stainless steel alloy containing from 25 to 35 percent by weight of chromium. A metal-coated substrate produced by this method and an article having thereon a fluorocarbon surface coated by this method are also described.

18 Claims, No Drawings

THERMAL SPRAYING OF STAINLESS STEEL

This invention relates to the thermal spraying of stainless steel, especially as applied as an intermediate stage in the provision of a non-stick coating layer over a substrate metal.

It is well known to spray on to a roughened substrate surface a fluoropolymer dispersion, to remove the dispersant or solvent, and to cure or sinter so as to give a coating layer.

In order to improve the adhesion of this layer to the substrate it is also well known first to flame-spray metal droplets or particles on the substrate so as to give a rough surface for the fluorocarbon polymer adhesion. An example of such flame sprayed metal is stainless steel, which is a general name for alloys of iron chromium, (typically about 18%) nickel (typically about 8%) and minor additives such as titanium, manganese, silicon etc. However, it is known in the art that problems of coating breakdown can arise and it is recognised generally that many of these have their roots in corrosion phenomena as between the substrate and the flame-sprayed metal For example, it is accepted that aluminium is not a very suitable substrate metal for such techniques and this is believed to be because of the risk of "white rust" corrosion, that is to say formation of aluminium oxides within the coating layers.

The present invention has originated from a consideration of this problem and involves utilisation of a form of stainless steel With an unusually high chromium level and optionally with increased nickel level.

On an aluminium substrate this runs completely contrary to previous expectations, and the use of additional chromium is counter-indicated not only by cost but also by the expectation of increased possibility of white rust (corrosion due to aluminium salts). due to increased chromium content. However, and as discussed in detail below, we believe we have identified a different corrosion problem as being more significant although hitherto not appreciated, and we can alleviate that problem to obtain improved coatings, any risk of "white rust" formation being more than offset by curing this other problem having its origin in "red rust" (corrosion due to ferrous salts) formation.

In one aspect the invention consists in a method of preparing a roughened surface for subsequent coating with a fluoro polymer in a liquid medium, in which method the surface is thermally sprayed (e.g. flame sprayed or sprayed on using an electric arc or plasma gun) with a stainless steel alloy the chromium content of which is increased over that of standard stainless steel.

Preferably the chromium content of the stainless steel, being greater than the normal 18% of standard stainless steel, ranges up to 35%. Most preferably it lies within the range of 25 to 35% by weight.

Preferably also there is some small adjustment in the nickel content of the stainless steel which can be up to 15%. that is to say rather greater than the normal 8% figure for standard stainless steel.

A preferred composition of stainless steel for carrying out the method of the invention is therefore 25 to 35% by weight of chromium, 8 to 15% by weight of nickel. 0.1% maximum by weight of carbon 2% maximum by weight of manganese, and 0.4% maximum by weight of silicon, with the remainder being iron and incidental impurities.

The method as defined above is typically carried out to provide a rough surface With protruding particles. These particles can occupy, for maximum roughness, somewhere from 50 to 85% of the total area of the substrate to be eventually coated. The roughness of the particles themselves is preferably from 25 to 50 % microns transverse dimension, most preferably by way of example 32 microns.

Typically, the substrate surface itself has previously been roughened before being thermally sprayed. Such previous roughening can typically have the dimensions of from 15 to 20 microns peak-to-valley distance.

In the method of the invention as defined above a wide range of substrate metals can be used but it is a particular advantage of the invention that even the more difficult substrate metals such as aluminium may be utilised.

The invention also extends to the metal coated substrate produced by the above method. In particular, however, the invention further extends to the above method combined with a subsequent coating stage with fluorocarbon polymer, for example coating the fluorocarbon polymer from liquid media (dispersant or solvent vehicle) and subsequent drying (e.g. at 120° C. to 150° C.) and curing or sintering stages (e.g. at 200-450° C., for up to 30 minutes) which together achieve a non-stick and durable, corrosion resistant, layer.

The invention of course further extends to an article having a surface comprising such a fluorocarbon layer secured to an intermediate corrosion-resistant layer as described above. The article in question can be a tool (secateurs, shears, fork).

The above invention using an excess of chromium in the thermally-sprayed alloy, is not predictable from prior art, especially in the context of an aluminium substrate where the use of excess chromium might be expected to give even more aluminium oxides. However, although we do not wish to be governed by any theory as to the operation of the method, it appears likely that the phenomenon of red rust, previously unexpected in stainless steel is in fact present, and although not always immediately noticeable, persists over a long period. It Would appear to have its origin in the drastic thermal spraying conditions apparently leading to at least superficial loss of chromium in at least some of the metal particles probably dependent upon their individual history as they pass differently through different temperature zones.

The following observations appear to support the above hypothesis.

1. Glass panels metal sprayed with traditional stainless steel grades of wire produced red corrosion products in neutral salt fogs (ASTM B4117), static 5% sodium chloride solutions and static 10% acetic acid solutions within a 25 hour exposure duration.

2. Aluminium plaques (of both cast LM6 and wrought 1200 grades) metal sprayed with traditional stainless steel grades of wire produced both red and white corrosion products in boiling 10 % acetic acid solution in some cases after only 20 minutes exposure.

3. Electron microprobe analysis of the metal deposited on to panels showed a cored structure, consisting of a very thin surface layer containing approximately 14% chromium and in some cases the surprising situation of a bulk central region with virtually no chromium present. The other alloy elements were evenly distributed.

The non-staining properties of stainless steel are due to the formation of a tenacious and resistant oxide film based on chromium. It is generally regarded that chromium levels below 14-15% are insufficient to impact protection and the structure of the deposited layer is therefore such that the iron oxide film formed is extremely thin. Any abrasion is likely to break the film to expose the central core Insufficient chromium is present to heal the break in the film and corrosion proceeds unabated.

4. Aluminium vessels which had been metal sprayed using traditional stainless steel wire were used to boil a 10% acetic acid solution for 3 hours. In all cases a red discolouration was found, allied sometimes with areas of white corrosion products. In an effort to identify the red product a pan was left standing for 30 minutes in a 10% oxalic acid solution. After this time the acid was discoloured a nd the pan restored to its original metallic appearance. Polarographic analysis of the acid solution indicated the pressure of $Fe^{2+}$ and $Fe^3$ ions. Another similarly treated Pan was filled with deionized water and was still discoloured even after a 2 hour boil.

5. Panels of typical cookware compositions such as cast or wrought aluminium stainless steel or cast iron when coated with the specified wire in the prescribed manner have not shown and tendency to for either red or white corrosion products in typical cooking environments such as boiling salted water, hot detergents, salty steam and boiling acetic acid solutions after a minimum three hour exposure.

I claim:

1. A method of preparing a roughened surface for subsequent coating with a fluoropolymer in a liquid medium, in which method said surface is thermally sprayed with a stainless steel alloy wherein said stainless steel contains from 25 to 35% by weight of chromium.

2. A method according to claim 1, wherein said stainless steel contains from 8 to 15% by weight of nickel.

3. A method according to claim 1, wherein said stainless steel further comprises 8 to 15% by weight of nickel, 0.1% maximum weight of carbon, 2% maximum by weight of manganese and 0.4% by weight of silicon, the remainder being iron and incidental impurities.

4. A method according to claim 1, arranged to cover from 50 to 85% by area of said surface.

5. A method according to claim 4, wherein said thermally sprayed alloy comprises particles which range from 25 to 50 microns in their transverse dimension.

6. A method according to claim 1, wherein said surface is itself pre-roughened, prior to said thermal spraying.

7. A method according to claim 6, wherein the peak-to-valley distance of said pre-roughened surface is from 15 to 20 microns.

8. A method according to claim 1, wherein said surface is an aluminum surface.

9. A metal-coated substrate produced by the method defined in claim 1.

10. A metal-coated substrate having a roughened surface for subsequent coating with a fluoropolymer in a liquid medium, comprising:
    a substrate, and
    a coating formed by thermally spraying an alloy having from 25% to 35% by weight of chromium and from 8% to 15% by weight of nickel on said substrate, said coating forming said roughened surface on said substrate.

11. A metal-coated substrate according to claim 10, wherein said alloy further includes 0.1% maximum by weight of carbon, 2% maximum by weight of manganese and 0.4% maximum by weight of silicon, the remainder being iron and incidental impurities.

12. A metal-coated substrate according to claim 10, in which said thermally sprayed alloy covers from 50 to 85% of the area of the substrate to be subsequently coated with said fluoropolymer, and wherein said thermally sprayed alloy comprises particles which range from 25 to 50 microns in their transverse dimension.

13. A metal-coated substrate according to claim 10, in which said surface is pre-roughened prior to said thermal spraying, and wherein the peak-to-valley distance of said preroughened surface is from 15 to 20 microns.

14. A metal coated-substrate according to claim 10, wherein said surface is an aluminum surface.

15. A method of coating a substrate with a fluorocarbon layer, comprising:
    preparing a roughened surface on said substrate by thermally spraying a stainless steel alloy thereon, said stainless steel alloy containing from 25% to 35% by weight of chromium;
    coating the metal-coated substrate with a fluorocarbon layer from liquid medium;
    drying said coated substrate; and
    curing or sintering said substrate.

16. A method according to claim 15, wherein said drying is carried out at 120° to 150° C., and said curing or sintering is carried out at 200° to 450° C. for up to about 30 minutes.

17. An article having thereon a fluorocarbon surface coated by the method as defined in claim 15.

18. An article according to claim 15, wherein said article is in the form of a tool.

* * * * *